US009424505B2

(12) United States Patent
Thalappil et al.

(10) Patent No.: US 9,424,505 B2
(45) Date of Patent: Aug. 23, 2016

(54) LUMINESCENT GRAPHENE PATTERNS

(75) Inventors: Pradeep Thalappil, Chennai (IN); Sreeprasad Theruvakkattil Sreenivasan, Kottayam (IN); Shihabudheen Mundampra Maliyekkal, Chennai (IN)

(73) Assignee: Indian Institute of Technology Madras, Chennai (IN)

( * ) Notice: Subject to any disclaimer, the term of this patent is extended or adjusted under 35 U.S.C. 154(b) by 535 days.

(21) Appl. No.: 13/825,398

(22) PCT Filed: Aug. 7, 2012

(86) PCT No.: PCT/IB2012/001518
§ 371 (c)(1),
(2), (4) Date: Mar. 21, 2013

(87) PCT Pub. No.: WO2013/175260
PCT Pub. Date: Nov. 28, 2013

(65) Prior Publication Data
US 2014/0220235 A1     Aug. 7, 2014

(30) Foreign Application Priority Data

May 25, 2012   (IN) .......................... 2097/CHE/2012

(51) Int. Cl.
*G06K 19/06*   (2006.01)
*C09K 11/06*   (2006.01)
*C09K 11/02*   (2006.01)

(52) U.S. Cl.
CPC .......... *G06K 19/0614* (2013.01); *C09K 11/025* (2013.01); *C09K 11/06* (2013.01); *G06K 19/06037* (2013.01)

(58) Field of Classification Search
None
See application file for complete search history.

(56) References Cited

U.S. PATENT DOCUMENTS 6,450,539 B1 *  9/2002   Bilbie ...................... B43L 1/12
                                                      283/81
7,682,523 B2   3/2010   Weisman et al.
(Continued)

FOREIGN PATENT DOCUMENTS

CN      101973712 A    2/2011
CN      102212616 A   10/2011
(Continued)

OTHER PUBLICATIONS

Barcode, accessed at http://web.archive.org/web/20120523004753/http://en.wikipedia.org/wiki/Barcode, last modified on May 21, 2012, pp. 1-17.
(Continued)

*Primary Examiner* — Nathan T Leong
(74) *Attorney, Agent, or Firm* — Pepper Hamilton LLP (57) ABSTRACT

A luminescent nanocomposite comprising functionalized graphene and a luminescent moiety, its fabrication, and uses are described. The luminescent moiety is anchored non-covalently to the functionalized graphene. Luminescence properties of the nanocomposite may be modulated by choosing appropriate luminescent moieties such as native lactoferrin, native lactoferrin protected gold clusters, and so forth. Mechanical properties of the nanocomposite may be modulated by adding a biopolymer such as Chitosan. The nanocomposite may be used as a luminescent ink for encoding information, or a luminescent film for tagging articles of manufacture such as electronic waste components.

14 Claims, 4 Drawing Sheets

(56) References Cited

U.S. PATENT DOCUMENTS

| | | | | |
|---|---|---|---|---|
| 2005/0042428 | A1* | 2/2005 | Dean | C09K 11/025 428/195.1 |
| 2008/0143762 | A1* | 6/2008 | Obrea | B41J 3/51 347/6 |
| 2012/0052513 | A1* | 3/2012 | Thalappil | A61K 49/0017 435/7.23 |
| 2012/0116094 | A1* | 5/2012 | Swager | C01B 31/0213 548/256 |

FOREIGN PATENT DOCUMENTS

| | | |
|---|---|---|
| JP | 2000347568 A | 12/2000 |
| JP | 2006227150 A | 8/2006 |
| WO | WO 2012/028964 A2 | 3/2012 |

OTHER PUBLICATIONS

QR code, accessed at http://web.archive.org/web/20120524045452/http://en.wikipedia.org/wiki/QR_Code, last modified on May 23, 2012, pp. 1-13.
International Search Report and Written Opinion for PCT/IB2012/001518 dated Jan. 11, 2013.
About UPS, Company History, http://www.ups.com/content/in/en/about/index.html?WT.svl=Footer (Printed from Internet Feb. 14, 2013).
Adolfsson-Erici et al., Triclosan, a commonly used bactericide found in human milk and in the aquatic environment in Sweden, *Chemosphere* (2002), 46:1485-1489.
AgeAlert™, How Age Alert™ works, http://www.polymeragingconcepts.com/how.htm (Printed from Internet Feb. 14, 2013).
Apple Reuse and Recycling Program, http://www.apple.com/recycling/gift-card/ (Printed from Internet Feb. 24, 2013).
BCC Research: Press Room, Electronic Waste Recovery: Global Markets (MST037B) (Jun. 30, 2010), http://www.bbcresearch.com/pressroom/report/code/MST037B.
Borg et al., Trends in optical recording, *Journal of Magnetism and Magnetic Materials* (Mar. 1999), 193(1-3):519-525 (Abstract).
Cao et al., Decoration of graphene oxide sheets with luminescent rare-earth complexes, *Carbon* (Nov. 17, 2010), 49:1502-1507.
Chandra et al., Biodegradable Polymers, *Prog. Polym. Sci.* (1998), 23:1273-1335.
Digital Watermarking Alliance: Quick Facts, http://www.digitalmarketingalliance.org/quickfacts.asp (Printed from Internet Feb. 14, 2013).
Electronic Recycling International: Products We Recycle, http://electronicrecyclers.com/productswerecycle.aspx (Printed from Internet Feb. 14, 2013).
ISRI Unveils Preliminary Findings from 2011 Electronics Recycling Industry Survey, http://www.isri.org/ISRI/Whats_New/ISRI_Unveils_Preliminary_Findings_from_2011_Electronics_Recycling_Industry_Suryey.aspx (Apr. 8, 2011).
Federal Express Recycling, http://about.van.fedex.com/recycling (Printed from Internet Feb. 14, 2013).
Fuji Xerox: International Resource Recycling System, http://www.fujixerox.com/eng/company/ecology/cycle/newstyle/international/ (Printed from Internet Feb. 14, 2013).
Huang et al., The preparation of graphene hybrid films decorated with poly[2-methoxy-5-(2"-ethyl-hexyloxy)-1,4-phenylene vinylene] particles prepared by non-solvent induced precipitation, *Carbon* (Aug. 24, 2011), 50(1):216-224 (Abstract).
Jedema, Phase-change materials: Designing optical media of the future, *Nature Materials* (2007), 6:90-91 (Abstract).
Kovtyukhova et al., Layer-by-Layer Assembly of Ultrathin Composite Films from Micron-Sized Graphite Oxide Sheets and Polycations, *Chem. Mater.* (Jan. 28, 1999), 11:771-778.
Li et al., Controlled Fabrication of Fluorescent Barcode Nanorods, *ACS Nano.* (Jul. 27, 2010), 4(8):4350-4360 (Abstract).
Lin et al., Dramatically Enhanced Photoresponse of Reduced Graphene Oxide with Linker-Free Anchored CdSe Nanoparticles, *ACS Nano.* (May 25, 2010), 4(6):3033-3038 (Abstract).
Metech Recycling: Responsible Electronics Recycling, http://www.metechrecycling.com/recycling.htm (Printed from Internet Feb. 14, 2013).
MicroDot U.S., http://www.microdotus.com (Printed from Internet Feb. 14, 2013).
Municipal Solid Waste Generation, Recycling, and Disposal in the United States: Facts and Figures for 2008, United States Environmental Protection Agency (Nov. 2009).
Nair et al., Organic-Soluble Antimicrobial Silver Nanoparticle—Polymer Composites in Gram Scale by One-Pot Synthesis, *ACS Applied Materials & Interfaces* (Nov. 2, 2009), 1(11):2413-2419.
National Strategy for Electronics Stewardship, Interagency Task Force on Electronics Stewardship by White House Council on Environmental Quality, Environmental Protection Agency and General Services Administration (Jul. 20, 2011).
Park et al., Light-Emitting Color Barcode Nanowires Using Polymers: Nanoscale Optical Characteristics, *ACS Nano.* (Aug. 13, 2010), 4(9):5155-5162 (Abstract).
Ramstedt et al., Synthesis and Characterization of Poly(3-Sulfopropylmethacrylate) Brushes for Potential Antibacterial Applications, *Langmuir* (Feb. 10, 2007), 23(6):3314-3321 (Abstract).
Recycling your Dell, Responsible Recycling: Dell Bans E-Waste Exports, http://content.dell.com/us/en/corp/d/corp-comm/e-waste# (Printed from Internet Feb. 14, 2013).
Recycling Promise: PROduct lifestyle management and information tracking using Smart Embedded system, http://www.promise.no/ (Printed from Internet Feb. 14, 2013).
Samsung Recycling Direct, http://www.samsung.com/us/aboutsamsung/citizenship/usactivities_environment_samsungrecyclingdirect.html (Printed from Internet Feb. 14, 2013).
SenseAwareSM powered by FedEx, http://www.senseaware.com/what-is-sensaware/ (Printed from Internet Feb. 14, 2013).
Si et al., Synthesis of Water Soluble Graphene, *Nano Letters* (May 23, 2008), 8(6):1679-1682.
Sims Recycling Solutions: Who is Sims Recycling?, http://www.simsrecycling.com/About-Us?sc_site=SRSUS (Printed from Internet Feb. 14, 2013).
Sreeprasad et al., Transparent, Luminescent, Antibacterial and Patternable Film Forming Composites of Graphene Oxide/Reduced Graphene Oxide, *ACS Applied Materials & Interfaces* (Jun. 20, 2011), 3:2643-2654.
Villaneuva et al., Paper waste—recycling, incineration or landfilling? A review of existing life cycle assessments, *Waste Manag.* (Apr. 11, 2007), 27(8):529-46 (Abstract).
Waste Management, Inc.: North America's leading provider of integrated environmental solutions, http://www.wm.com/about/index.jsp (Printed from Internet Feb. 14, 2013).
Wei et al., Bactericidal Activity of TiO2 Photocatalyst in Aqueous Media: Toward a Solar-Assisted Water Disinfection System, *Environ. Sci. Technol.* (May 1994), 28(5):934-938 (Abstract).
Xavier et al., Luminescent quantum clusters of gold in transferrin family protein, lactoferrin exhibiting FRET, *Nanoscale* (Sep. 30, 2010), 2:2769-2776.
Zhou et al., Hydrothermal Dehydration for the "Green" Reduction of Exfoliated Graphene Oxide to Graphene and Demonstration of Tunable Optical Limiting Properties, *Chem. Mater.* (May 26, 2009), 21(13):2950-2956 (Abstract).

* cited by examiner

LUMINESCENT GRAPHENE PATTERNS

CROSS-REFERENCE TO RELATED APPLICATIONS

This application is a U.S. national stage filing under 35 U.S.C. §371 of International Application No. PCT/IB2012/001518, filed on Aug. 7, 2012 and entitled "Luminescent Graphene Patterns," which claims priority to Indian Patent Application No. 2097/CHE/2012, filed on May 25, 2012 and entitled "Luminescent Graphene Patterns," the disclosures of which are hereby incorporated by reference herein in their entireties.

BACKGROUND

Barcodes are the most common form of tagging used for tracking and identifying objects—whether e-waste or otherwise. But barcodes can convey very limited information since they encode a short bit string as a series of parallel bars in two colors. More recently, two dimensional (2D) matrices, commonly known as QR codes, have been developed and offer a significantly higher information density. The method of reading information from a barcode or a QR code requires the surface on which these codes are printed to be of a certain minimum size and essentially flat. This poses a serious limitation on the use of such codes.

Waste, especially electronic waste (e-waste) comes in all shapes and sizes which may not always be amenable to tagging by barcodes or QR codes. With increasingly stringent global regulations requiring manufacturers and waste disposal companies to track their waste, a better method for tagging and tracking objects is necessary.

Graphene, a 2D form of carbon, has been shown to have many special properties such as high mechanical stiffness, high elasticity, tunable band gap and excellent electron transport, potentially lending it to many interesting applications. Conventionally, graphene is obtained by physical exfoliation of graphite, but the method suffers from poor yield. Chemical methods such as chemical vapor deposition, chemical reduction of graphite oxide, liquid phase exfoliation of graphite, and self-assembly are being researched for large-scale synthesis of graphene.

SUMMARY

In some embodiments, the present disclosure describes a luminescent nanocomposite composition made from graphene oxide, reduced graphene oxide, or a combination thereof, and a luminescent moiety, wherein the luminescent moiety interacts non-covalently with the graphene oxide, the reduced graphene oxide or the combination thereof.

In some embodiments, a method for preparing a luminescent film may include heating a luminescent nanocomposite composition comprising graphene oxide, reduced graphene oxide or a combination thereof, and a luminescent moiety to a temperature from about 30° C. to about 50° C., drying the composition to form a film, immersing the film in ammonia solution, and washing the film to remove the ammonia.

In some embodiments, a method of labeling an article of manufacture with a removable and rewritable label may include depositing a luminescent nanocomposite composition on the article of manufacture, wherein the luminescent nanocomposite composition comprises graphene oxide or reduced graphene oxide, or a combination thereof, and at least one luminescent moiety, wherein the luminescent moiety interacts non-covalently with the graphene oxide or reduced graphene oxide.

In some embodiments, an article of manufacture may comprise a removable and rewritable label, wherein the label is comprised of a luminescent nanocomposite composition comprising graphene oxide, reduced graphene oxide, or a combination thereof, and a luminescent moiety, wherein the luminescent moiety interacts non-covalently with the graphene oxide, the reduced graphene oxide or the combination thereof.

DETAILED DESCRIPTION

A desirable quality for using a nanomaterial for waste tracking is that it can be inexpensive and amenable to large-scale synthesis. Of the many potential nanomaterials, graphene is particularly promising. In some aspects, luminescent nanocomposite compositions are described. The nanocomposite composition, the methods of making the nanocomposite composition, and the methods of using the nanocomposite composition as described herein, are not limited to a single composition or a single process.

In some embodiments, the composition may comprise graphene oxide, reduced graphene oxide, or any combination thereof. Functionalized graphene is capable of non-covalently interacting with a variety of luminescent moieties. As such, graphene functionalized with any functional group may be used for this composition. In some embodiments, the composition may comprise sulfonated graphene, fluorinated graphene, or chlorinated graphene, or any combination thereof.

Proteins, non-protein molecules and polymers that exhibit luminescence may form clusters with transition metal atoms, transition metal ions, rare-earth metal atoms, or rare-earth metal ions, or any combination thereof. The color of luminescence of such clusters is determined by the oxidation state of the metal atom or ion as well as the luminescent properties of the cluster forming molecules. Luminescent moieties with positive and negative functionalities maybe attached electrostatically to graphene oxide or appropriately functionalized graphene. In some embodiments, the luminescent moiety may comprise a protein such as, for example, native lactoferrin protein (NLf), bovine serum albumin, or lysozyme. In other embodiments, the luminescent moiety may comprise a small molecule such as, for example, glutathione or cysteine.

In some embodiments, the luminescent moiety may comprise a transition metal including, but not limited to, Au (gold), Ag (silver), Cd (cadmium), Se (selenium), or Hg (mercury), or any combination thereof. In other embodiments, the luminescent moiety may comprise a rare-earth metal including, but not limited to, Eu (Europium).

Any cluster having a positive functionality can be anchored into graphene. The composition may be configured to allow anchoring of more functional groups than allowed by graphene alone by adding a polymer. In some embodiments, the composition may comprise one or more polymers such as, for example, chitosan, poly acrylic acid, polypyrrole, poly (allyl methacrylate), poly(vinylidene fluoride), poly(2-methoxy-5-(2'ethyl-hexyloxy)-1,4-phenylene vinylene), and the like.

In general, any luminescent moiety can be anchored to appropriately functionalized graphene as long as the functionality of graphene has opposite charge to that of the luminescent moiety under normal conditions. Any combination of luminescent moieties may also be anchored to the appropriately functionalized graphene. One can envision various combinations of luminescent moieties and graphene functionalities for creating a diverse set of nanocomposites that luminesce across the optical spectrum tailored to specific applications. The specific combination of the luminescent moiety and the functional group of graphene will determine the wavelength (color) of luminescence of the nanocomposite. In some embodiments, the composite may comprise graphene oxide and NLf. In other embodiments, the composite may comprise graphene oxide and NLf-protected gold clusters (Au@NLf). In yet other embodiments, the composite may comprise reduced graphene oxide and NLf. In certain embodiments, the composite may comprise reduced graphene oxide and Au@NLf, and in particular embodiments, the composite may comprise reduced graphene oxide, NLf, and chitosan.

In some aspects, methods of preparing a luminescent nanocomposite composition are described. Such a composition may be used as, for example, a luminescent ink which may be invisible under normal circumstances and may reveal itself only when exposed to certain light conditions such as, for example, ultra-violet light. Invisible inks may have uses in secure data transfer for military, government, or confidential private communications.

In some embodiments, functionalized graphene is suspended in water, a luminescent moiety is suspended in water at an appropriate concentration, and known volumes of the two suspensions are mixed and stirred for a sufficient time to form the luminescent nanocomposite suspension. In some embodiments, the water may be purified water, deionized water, or distilled water.

Whereas, the concentration of functionalized graphene suspension will depend on the extent of functionalization of graphene being used, in some embodiments, the concentration of functionalized graphene is from about 0.01 wt % to about 1 wt %. "wt %" refers to the percent ratio of the weight of graphene present in a solvent to the weight of the solvent and the graphene combined to prepare the suspension. For example, if 0.5 g of graphene is suspended in 99.5 g (i.e., 99.5 ml) of water, the concentration of graphene is 0.5 wt %. In some embodiments, comprising sulfonated graphene, up to about 0.2 wt % graphene may be used. In other embodiments comprising reduced graphene oxide, up to about 0.05 wt % graphene may be used. Polymers like chitosan can assisting in dispersing graphene in water. As such, in some embodiments wherein, polymers like chitosan are present in the suspension, a higher concentration of graphene of up to about 1 wt %, up to about 0.9%, or up to about 0.8% may be used.

In some embodiments, a chitosan solution is added to the aqueous mixture comprising the luminescent nanocomposite. The chitosan solution may comprise about 0.2% to about 2% chitosan by weight in a dilute acid solution. In some embodiments, the chitosan solution may comprise about 0.2% to about 1.8% by weight, about 0.2% to about 1.6% by weight, about 0.2% to about 1.4% by weight, about 0.2% to about 1.2% by weight, about 0.2% to about 1.0% by weight, about 0.4% to about 2% by weight, about 0.6% to about 2% by weight, about 0.8% to about 2% by weight, about 1.0% to about 2% by weight, about 0.4% to about 1.8% by weight, about 0.6% to about 1.6% by weight, about 0.8% to about 1.4% by weight, or about 1.0% to about 1.2% by weight. In some embodiments, the acid may be an acid such as, for example, acetic acid, nitric acid, or hydrochloric acid. In some embodiments, the ratio of volume of the aqueous mixture comprising the luminescent nanocomposite to volume of chitosan solution may be from about 1:0.1 to about 1:0.5.

In certain applications, such as, for example, labeling an article of manufacture, it may be desired to form luminescent films. One application of luminescent nanocomposite films is for tagging and tracking waste articles which may be too small in size to be tagged by a traditional barcode or a QR code, or may not have a flat surface necessary for affixing a traditional barcode or a QR code. In some aspects, the present disclosure describes methods of preparing luminescent films. In some embodiments, a luminescent film maybe formed using a self-drying methodology. In some embodiments, the luminescent nanocomposite composition described above is heated for a time to dry the composition to form a film, followed by immersing the film in a dilute basic solution, followed by washing the film with, for example, one or more of water, ethanol, or methanol repeatedly to remove the basic solution. In some embodiments, the water may be distilled water or deionized water. In certain embodiments, the composition may be heated to temperatures of about 20° C., about 25° C., about 30° C., about 35° C., about 40° C., about 45° C., about 50° C., about 55° C., about 60° C., about 65° C., about 70° C., or any range between any two of these temperatures. In some embodiments, the composition may be dried by, for example, freeze drying, vacuum drying, and/or the like. In certain embodiments, the dilute basic solution may include, but is not limited to, ammonia solution, dilute sodium hydroxide solution, or dilute potassium hydroxide solution. In particular embodiments, the luminescent moiety may include, but is not limited to, NLf or Au@NLf. In other embodiments, the luminescent composition may comprise other polymers such as, for example, chitosan.

In some aspects, methods of using the luminescent nanocomposite compositions are described. In some embodiments, the luminescent nanocomposite composition may be used as a luminescent invisible ink for printing data, that is visible only under specific conditions, such as, for example, under ultraviolet light. In some embodiments, the luminescent nanocomposite may be used in the form of films for labeling an article of manufacture. Examples of luminescent nanocomposite compositions for such use include, but are not limited to, a luminescent nanocomposite composition comprising graphene oxide and NLf, a luminescent nanocomposite composition comprising graphene oxide and Au@NLf, a luminescent nanocomposite composition comprising reduced graphene oxide and NLf, and a luminescent nanocomposite composition comprising reduced graphene oxide and Au@NLf. In some embodiments, the luminescent nanocomposite composition may be deposited on an article of manufacture as a transparent thin film. In other embodiments, the luminescent nanocomposite composition may be deposited on an article of manufacture by spraying a surface of the article of manufacture or by stamping a surface of the article of manufacture. In some embodiments, the luminescent nanocomposite composition maybe deposited in the form of a barcode or a QR code. The article of manufacture in above mentioned cases may be waste articles such as, for example, discarded electronic components, spent printing cartridges, biological waste, chemical waste, radioactive waste, and so forth.

The data can generally be any type of data, such as text, numbers, symbols, images, musical notes, barcodes; computer code, and so on. In some cases, the data can be data that one wishes to remain confidential or to at least limit the number of individuals who can read or access the data.

In some embodiments, the label comprising the luminescent nanocomposite composition film may be detected under special conditions such as, for example, under ultraviolet light. Examples of detectors that may be used for detecting labels made from the luminescent nanocomposite films include, but are not limited to, ultraviolet luminescence sensors, fluorescence spectrometers, Raman spectrometers, and the like.

In some aspects, an erasable, rewritable luminescent label for an article of manufacture is described. The label may be created using the luminescent nanocomposite composition described herein above, either in the form an ink or as a film. In some embodiments, the label may be erased by removing the luminescent moiety from the nanocomposite composition or film by wetting the label. In other embodiments, a different luminescent moiety may be added to the nanocomposite composition or film, to form a second label. In other embodiments, a plurality of different luminescent moieties may be added to nanocomposite composition(s) or film(s), to form a plurality of labels. In some embodiments, the luminescent nanocomposite label may be affixed to an article that may not have a flat surface or may be too small for affixing a traditional barcode or QR code label. Examples of articles of manufacture that can be labeled using the luminescent nanocomposite described herein include, but are not limited to, electronic component such as, for example, printed circuit boards, discarded batteries, discarded LCD displays, spent printing cartridges, and the like; or hazardous waste such as, for example, explosives, radioactive waste, biological waste, and the like. In other embodiments, the luminescent nanocomposite may be used as luminescent inks for imprinting and transferring secure or confidential data for, without limitation, military, government of private industry use. The luminescent nanocomposite inks may be tailored to vanish after a pre-designed period of time, or may be made removable by wetting. The susceptibility of the label to water can be modified by coating one or more layers on top of the label to limit or control access of water to the label. The layers may be configured to be removable when desired. Examples of layers that may be used include, but are not limited to, a shrink wrap film, a stretch wrap film, a cling wrap film, an adhesive plastic film, a low density polyethylene film, PVC films, a wax paper, and the like.

In some aspects, the present disclosure describes an article of manufacture that includes a removable and rewritable label comprising the luminescent nanocomposite described above. In particular embodiments, the label may comprise graphene oxide and NLf. In other embodiments, the label may comprise reduced graphene oxide and NLf. In some embodiments, the label may comprise graphene oxide and Au@NLf. In other embodiments, the label may comprise reduced graphene oxide and Au@NLf. In yet other embodiments, the label may comprise chitosan in addition to the functionalized graphene oxide and the luminescent moiety.

Embodiments illustrating the method and materials used may be further understood by reference to the following non-limiting examples:

EXAMPLES

Example 1

Pre-Oxidation of Graphite

In a 250 mL beaker, concentrated $H_2SO_4$ (25 mL), 5 g of $K_2S_2O_8$ and 5 g of $P_2O_5$ were taken and heated to 90° C. with constant stirring. After all the reactants were completely dissolved, the reaction temperature was decreased to 80° C. To this reaction mixture, 6 g of graphite powder was added slowly. Bubbling was observed initially and subsided subsequently, over a period of 30 minutes. Temperature of the reaction mixture was maintained at 80° C. for 5 hours. Heating was stopped and the mixture was diluted with 1 L of distilled water and left undisturbed overnight. The resultant solution was then filtered and washed to remove excess acid. The solid product was dried in air overnight to yield pre-oxidized graphite.

Example 2

Oxidation to Graphite Oxide (GO)

230 mL of concentrated $H_2SO_4$ was maintained at 0° C. using an ice bath. Pre-oxidized graphite was then added to this and stirred. 15 g of $KMnO_4$ was added slowly making sure that the temperature never went beyond 10° C. Then, the temperature was raised to 35° C. and allowed to react for 2 hours. Subsequently, 1 L of distilled water was added carefully keeping the temperature below 50° C. The reaction mixture was stirred for 2 hours and then 1.5 L of distilled water and 25 mL of 30% $H_2O_2$ were added. The mixture was kept at room temperature for a day and the supernatant was decanted. The remaining solution was centrifuged and washed with 10% HCl followed by distilled water. This was repeated several times. The resultant solid was dried and 2% (w/w) dispersion was prepared in distilled water. This dispersion was dialyzed for 3 weeks to remove all unwanted contaminants like salts and acid. Then the dispersion was diluted to 0.1% (w/w).

Example 3

Hydrothermal Deoxygenation of Graphene Oxide (GO) to Reduced Graphene Oxide Nanosheets Reduction of GO was performed by the hydrothermal method. In a typical synthesis procedure, GO was sonicated for 45 minutes. (CREST TRU-SWEEP 27D, 50 Hz) to exfoliate the suspension completely and centrifuged at 5000 rpm to remove the unexfoliated GO. About 50 mL of the purified exfoliated GO solution (0.05 wt %) was transferred to a Teflon-lined hydrothermal reaction vessel and heated at 180° C. for 6 hours. After 6 hours, the vessel was cooled to room temperature. A black precipitate of RGO settles at the bottom. This was redispersed in distilled water by mild sonication.

Example 4

Sulfonation of RGO

To increase the stability of graphene in water, sulfonic acid groups were introduced onto RGO surface through a simple sulfonation procedure. 20 mg sulfanilic acid and 8 mg sodium nitrite were firstly dissolved in NaOH solution (0.25%). Then 4 mL, 0.1 M HCl was added to the above mixture and kept in an ice bath under stirring. After 15 minutes, aryl diazonium salt solution was added to 20 mL, 0.5 mg/ml, RGO dispersion with continuous stirring for 2 hours in an ice bath. After 2 hours, the solution was filtered and washed and redispersed in distilled water with a final concentration of 0.05 wt %. The pH of the solution was measured to be around 6.

Example 5

Preparation of Au@NLf

Au@NLf quantum clusters were synthesized by the following procedure: NLf and $HAuCl_4$ were mixed and stirred continuously for 5 minutes. Required amount of 1 M NaOH was added to the above mixture such that the final concentration was 5%. The mixture was stirred for 24 hours which results in the formation of Au@NLf. Au@NLf refers to a mixture of clusters, dominated by a cluster containing 25 atoms of gold, along with minor fractions of $Au_{13}$, which are protected by the protein molecule.

Example 6

Preparation of RGO/GO-NLf and RGO/GO-Au@NLf Composites

NLf was anchored onto RGO/GO substrate through a simple electrostatic interaction. To 5 mL GO/RGO (0.02 wt %), different volumes of NLf (12 mg/mL) was added. The sample was stirred for 2 hours and stored at 4° C. for further use. Similar method was used to make GO/RGO-Au@NLf composites in which known volume of Au@NLf was added to 5 mL of GO/RGO and stirred for 2 hours. The mixture was stored for further use at 4° C.

Example 7

Preparation of RGO-NLf-Ch Composite

Chitosan (Ch) is known to form composites with RGO. GO/RGO-NLf composites prepared as mentioned above were mixed with Ch solution (0.8% chitosan in 1.5% acetic acid) in 1:0.3 ratio (v/v). The mixture was stirred continuously for 2 hours. The homogeneous dispersion was then kept at 4° C. for further use. Similarly, GO/RGO-Au@NLf-Ch was also prepared by replacing NLf with Au@NLf in the above procedure.

Example 8

Preparation of RGO-Ch-NLf/Au@NLf Film

The above solution(s) were transferred to a Petri dish and kept in an oven maintained at 40° C. The mixture was allowed to dry and after complete drying, the film was immersed in ammonia solution (5 vol. %) for 15 minutes. Then, the films were washed repeatedly with distilled water to remove ammonia. This film can be easily peeled off for further use. For preparing red luminescent films, NLf was replaced with Au@NLf clusters.

The properties of the fabricated composites were studies using UV/Visible spectroscopy, Fourier Transform Infrared spectroscopy, Transmission and Scanning Electron microscopy, Photoluminescence and Raman spectroscopy.

Example 9

Addition of Luminescence

A luminescent iron binding protein, lactoferrin (NLf) or NLf protected Au clusters (Au@NLf) electrostatically was anchored at nearly neutral pH. The pH of GO and RGO dispersion was around 6.5. At this pH, the negatively charged functional groups will be in the ionized state making GO and RGO highly dispersible in water. The presence of negatively charged functional groups on RGO/GO was used for the formation of composites. The samples were characterized by Raman spectroscopy which showed a strong D-band pointing to the highly functionalized grapheme. The composite exhibited a weak bluish-green luminescence. Bright red luminescence was imparted to the composite by anchoring the protein protected clusters (Au@NLf) instead of pure NLf.

Example 10

Large Area Films

Properties and Applications

Figure 1:
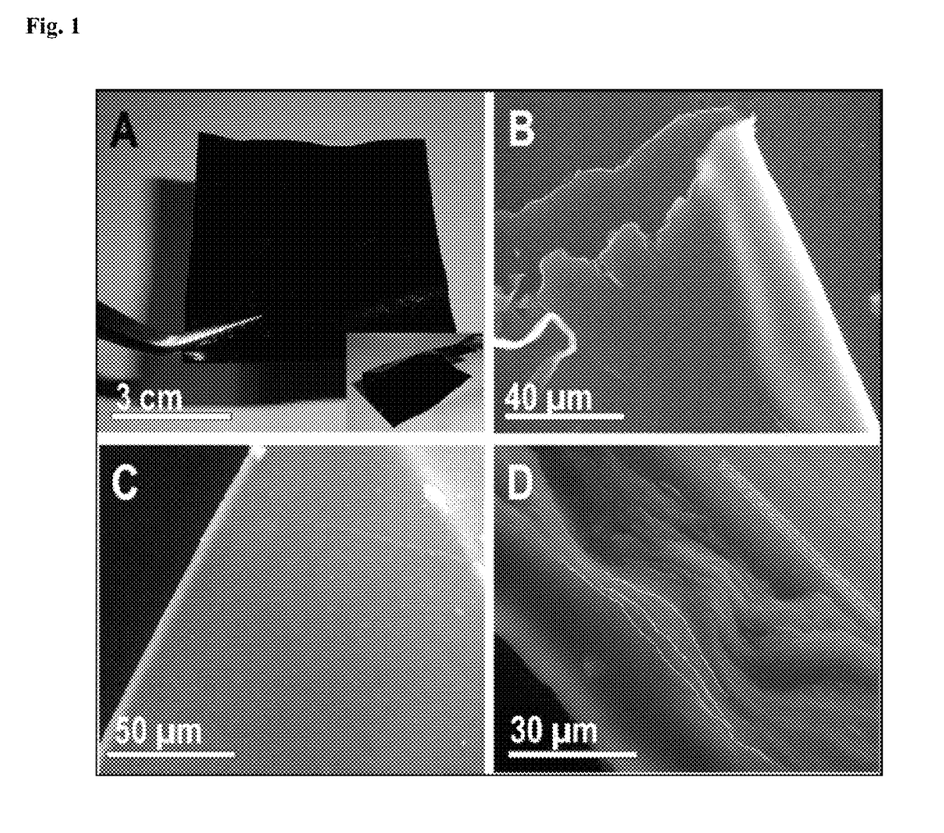
FIG. 1: (A) Photograph of a representative large area composite film. Inset shows the photograph of the folded film showing the flexibility of the film. SEM images of the films showing (B) the folded film edge, (C) surface of the film, and (D) higher magnification image of a cross-section of the film showing the layer-by-layer nature of film formation. Multiple layers are visible.

Large area RGO/GO based composite films were fabricated through a simple self-drying methodology as described above. Upon solvent evaporation, the composites formed large area films aided by chitosan. The presence of RGO increased the mechanical strength of the film. FIG. 1A below shows the photograph of macroscopic films. The as-fabricated films were found to be highly flexible (inset FIG. 1A). The film was characterized using SEM, Raman and fluorescence spectroscopy. FIGS. 1 B-D show the SEM images of the film. The SEM image of a folded edge of a film is shown in FIG. 1B, emphasizing the flexible nature. The film surface was found to be smooth (FIG. 1C). Higher magnification image of the edge of the film showed that it is formed by layer-by-layer assembly (FIG. 1D). The luminescence of the composite was found to be stable at a good window of pH and temperature windows, increasing the applicability of the composite.

Example 11

Erasable Patterns and Applications

Figure 2:
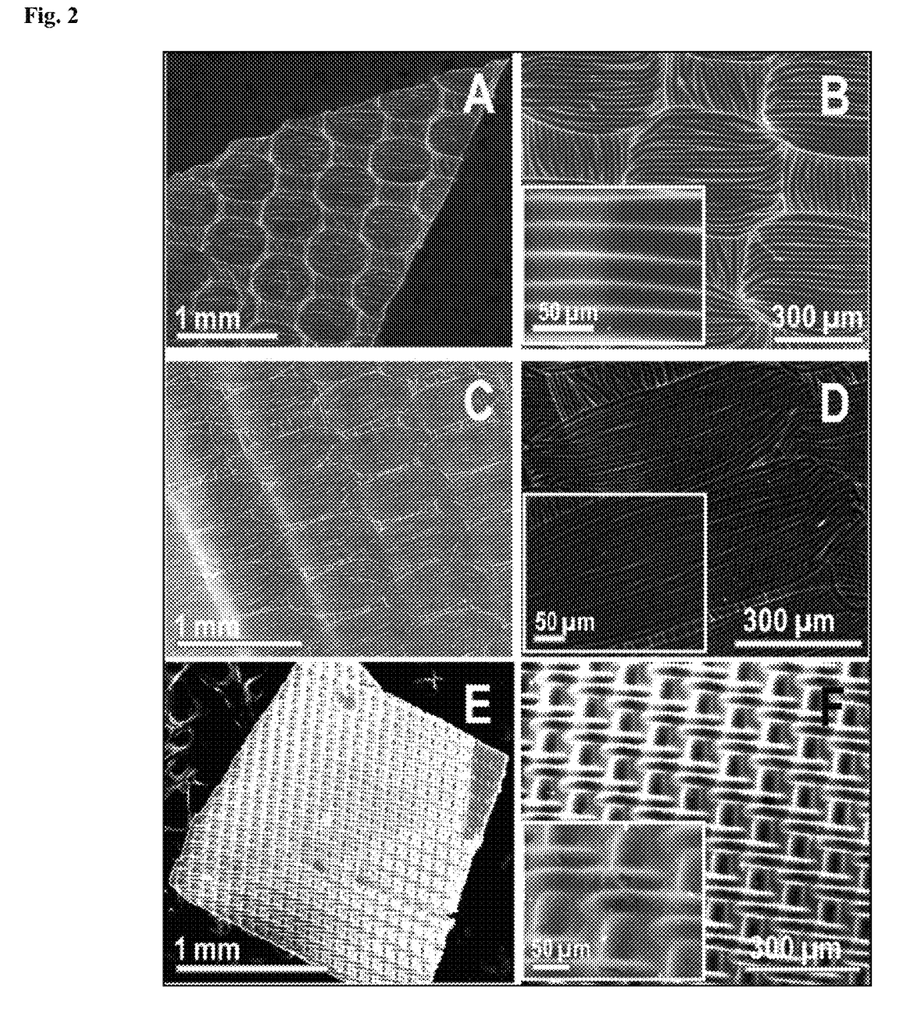
FIG. 2: SEM images of different patterns ascribed on representative RGO composite films. A number of patterns are shown in (A), (C), and (E) and their expanded views are shown in (B), (D), and (F), respectively.
Figure 3:
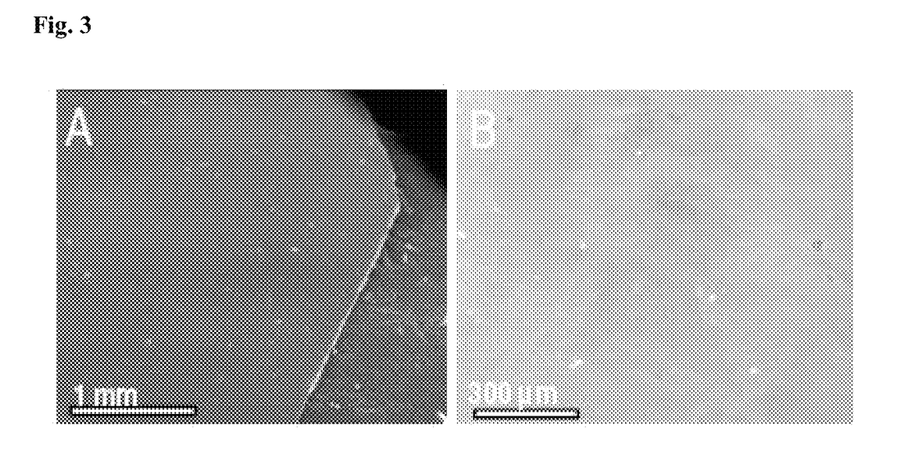
FIG. 3: SEM images of the same part of the film after three rounds of patterning and erasure. (A) low-magnification image and (B) higher magnification image of the inside portion. No trace of pattern can be seen. In the left side images, only one edge of the free-standing composite film is shown. The area outside the film is the carbon tape used for fixing the film.
Figure 4:
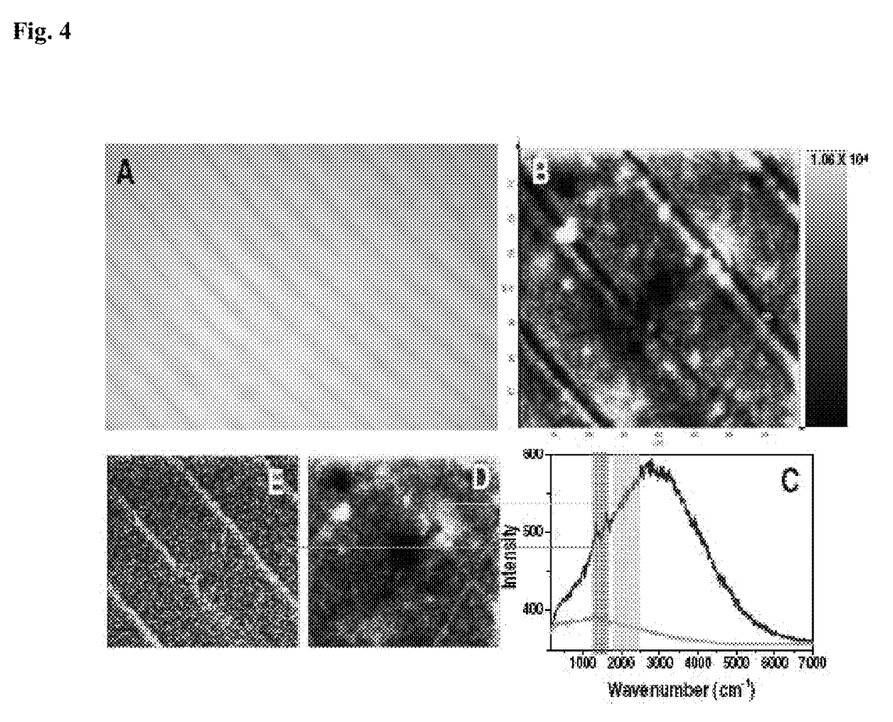
FIG. 4: Characterization of representative large area luminescent patterns. (A) Optical image of the pattern, (B) Raman spectral image collected from the pattern and (C) spectra from two locations of the image marked in (B). Color of the spectral traces corresponds to the locations, indicated in image (B). Raman spectral images generated (D) from the fluorescence of Au@NLf and (E) from the frequency range of 1300-1600 $cm^{-1}$ corresponding to D- and G-bands of RGO.

Large area patterns were inscribed on the prepared films. Luminescent patterns can also be fabricated through this methodology by incorporating NLf/Au@NLf in the composite. The inscribed pattern can be erased from the films and another pattern can be inscribed. Erasable and rewritable patterns may be useful in security coding and confidential data transfer. FIGS. 2A and B show the film after imprinting the first pattern. The pattern was erased by simply wetting of the film using water. After drying the film, a second pattern was inscribed. FIGS. 2C and D show the SEM images of this pattern. This pattern was also erased by wetting the film and a third pattern was inscribed (FIGS. 2 E and F). The film after erasure also was analyzed using SEM. No trace of imprinted pattern was seen, pointing to the complete erasure of the pattern (FIG. 3). The erasure and patterning can be done repeatedly. The Raman measurement clearly shows that the formed patterns are luminescent (FIG. 4). No significant change in florescence intensity was seen when exposed to a wide range of metal ions, change in pH (5-9), and temperature (10-50° C.).

Example 12

Protecting the Label from Water

A metal box was labeled with a luminescent composite pattern in the form of a bar-code. This bar-code was readable under ultraviolet light (standard forensic black light). The box was then inserted in a tank filled with water and agitated for about 2 minutes. Upon removal from the tank, the bar-code could no longer be read under ultraviolet light showing that the luminescent pattern was lost in water.

A separate metal box was labeled with another luminescent composite pattern in the form of a bar-code. A thin plastic film was then laminated on top of the luminescent pattern. It was confirmed that bar-code was readable under ultraviolet light. The box was then inserted in a tank filled with water and agitated for about 2 minutes. Upon removal from the tank, the bar-code was still readable under ultraviolet light confirming that a laminated plastic film protected the luminescent pattern from exposure to water. One may be able to substitute the laminated plastic film with other materials depending on the usage and base materials.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

All ranges disclosed herein are inclusive and combinable. As used herein, the term "about" means plus or minus 10% of the numerical value of the number with which it is being used. Therefore, about 50% means in the range of 40% to 60%.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of labeling an article of manufacture with a removable and rewritable label, the method comprising:
   heating a luminescent nanocomposite composition comprising graphene oxide, reduced graphene oxide, or a combination thereof, and at least one luminescent moiety from about 20° C. to about 70° C., wherein the luminescent moiety non-covalently interacts with the graphene oxide or reduced graphene oxide;
   forming a film of the composition by drying the composition to form the film; and
   depositing the film on the article of manufacture as a first label.

2. The method of claim 1, wherein the luminescent moiety is native lactoferrin, or native lactoferrin-protected gold cluster, or a combination thereof.

3. The method of claim 1, wherein depositing the film further comprises depositing the film having chitosan.

4. The method of claim 1, wherein depositing the film comprises depositing the film as a transparent thin film.

5. The method of claim 1, wherein depositing the film comprises depositing the film by spraying a surface of the article of manufacture.

6. The method of claim 1, wherein depositing the film comprises depositing the film by stamping a surface of the article of manufacture.

7. The method of claim 1, wherein the first label is a bar code or a QR code.

8. The method of claim 1, further comprising detecting the first label using ultraviolet light or Raman spectroscopy.

9. The method of claim 1, further comprising removing the first label by wetting the first label.

10. The method of claim 9, further comprising after removing the first label, depositing a luminescent nanocomposite composition as a second label on the article of manufacture.

11. The method of claim 1, wherein the article of manufacture comprises curved faces.

12. The method of claim 1, wherein the article of manufacture is an electronic component.

13. The method of claim 1, wherein the article of manufacture comprises recyclable waste.

14. The method of claim 1, further comprising:
   immersing the film in an ammonia solution; and
   washing the film with one or more of water, ethanol, and methanol to remove the ammonia.

* * * * *